US012438293B2

(12) United States Patent
Klein et al.

(10) Patent No.: US 12,438,293 B2
(45) Date of Patent: Oct. 7, 2025

(54) HOUSEHOLD APPLIANCE AND METHOD FOR ASSEMBLING A HOUSEHOLD APPLIANCE

(71) Applicant: ELECTROLUX APPLIANCES AKTIEBOLAG, Stockholm (SE)

(72) Inventors: Gerhard Klein, Rothenburg ob der Tauber (DE); Elisabeth Rebelein, Rothenburg ob der Tauber (DE); Ulrich Häutle, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 312 days.

(21) Appl. No.: 18/039,225

(22) PCT Filed: Nov. 19, 2021

(86) PCT No.: PCT/EP2021/082322

§ 371 (c)(1), (2) Date: May 27, 2023

(87) PCT Pub. No.: WO2022/117368

PCT Pub. Date: Jun. 9, 2022

(65) Prior Publication Data

US 2024/0006790 A1 Jan. 4, 2024

(30) Foreign Application Priority Data

Dec. 3, 2020 (EP) .................................... 20211487

(51) Int. Cl.
*H01R 12/70* (2011.01)
*H01R 12/62* (2011.01)
(Continued)

(52) U.S. Cl.
CPC ......... *H01R 12/7076* (2013.01); *H01R 12/62* (2013.01); *H01R 12/7088* (2013.01);
(Continued)

(58) Field of Classification Search
CPC ................ H01R 12/7076; H01R 12/62; H01R 12/7088; H01R 12/67; H01R 12/707;
(Continued)

(56) References Cited

U.S. PATENT DOCUMENTS 7,618,283 B1 * 11/2009 Costello ................. H01R 12/52 439/511
7,959,445 B1 * 6/2011 Daily ................... H01R 12/716 439/928
(Continued)

FOREIGN PATENT DOCUMENTS

CN 201478505 5/2010
EP 3267766 1/2018
(Continued)

OTHER PUBLICATIONS

International Search Report and Written Opinion for PCT/EP2021/082322, dated Feb. 18, 2022, 12 pages.

*Primary Examiner* — Gary F Paumen
(74) *Attorney, Agent, or Firm* — Chrisman Gallo Tochtrop LLC

(57) ABSTRACT

A household appliance (10), particularly a cooking appliance, more particularly a cooking hob, even more particularly an induction cooking hob, comprises a first circuit board (22) and a second circuit board (22) or a first circuit board (22) and a mains connection unit (36), particularly a mains terminal block or a power supply box. These pairs of units (22, 36) are electrically connectable by a connection means comprising at least one connection line (40, 60). The first circuit board (22) comprises a first electrical connector (52, 62) for an electrical connection for power and/or information transmission. The first electrical connector (52, 62) of the first circuit board (22) is equippable with the connection line (40, 60) after arrangement of the first circuit board (22) in a housing (12) of the household appliance (10), preferably after arrangement of the first and second circuit
(Continued)

boards (22) or of the first circuit board (22) and the mains connection unit (36) in the housing (12). At least the first circuit board (22) is arrangeable or arranged in the housing (12) of the household appliance (10) at a predefined position in a way that also the first electrical connector (52, 62) is arranged at a predefined position and the first electrical connector (52, 62), which is arranged at said predefined position, is accessible for the equipment with the connection line (40, 60) from above, preferably for an automated equipment in a top down movement, particularly by an equipment robot.

23 Claims, 6 Drawing Sheets

(51) Int. Cl.

| | |
|---|---|
| ***H01R 12/67*** | (2011.01) |
| ***H01R 43/01*** | (2006.01) |
| ***H01R 43/02*** | (2006.01) |
| ***H01R 43/26*** | (2006.01) |
| ***H05B 6/12*** | (2006.01) |

(52) U.S. Cl.

CPC ......... *H01R 43/01* (2013.01); *H01R 43/0256* (2013.01); *H01R 43/26* (2013.01); *H05B 6/1209* (2013.01); *H01R 12/67* (2013.01); *H01R 12/707* (2013.01)

(58) Field of Classification Search

CPC .... H01R 43/01; H01R 43/0256; H01R 43/26; H05B 6/1209

USPC ........................................ 439/928, 919, 76.1

See application file for complete search history.

(56) References Cited

U.S. PATENT DOCUMENTS

| | | | | |
|---|---|---|---|---|
| 7,963,796 | B2 | 6/2011 | Sypolt et al. | |
| 8,986,020 | B2 * | 3/2015 | Ishii | H01R 12/732 439/511 |
| 9,225,115 | B2 | 12/2015 | Malek et al. | |
| 10,218,100 | B2 | 2/2019 | Bussmann et al. | |
| 10,680,366 | B1 * | 6/2020 | Huang | H01R 12/725 |
| 2007/0275587 | A1 * | 11/2007 | Chang | H01R 12/7029 439/327 |
| 2021/0267021 | A1 * | 8/2021 | Jeanneteau | H05B 6/1263 |

FOREIGN PATENT DOCUMENTS

| | | |
|---|---|---|
| EP | 3599793 | 1/2020 |
| JP | 2012150892 | 8/2012 |
| WO | 2018141397 | 8/2018 |

* cited by examiner

HOUSEHOLD APPLIANCE AND METHOD FOR ASSEMBLING A HOUSEHOLD APPLIANCE

Generally, household appliances are assembled from modular components, which may be individual parts, e.g. motors, heating elements, pumps, or the like, or systems or subsystems, which themselves may be an assembly of single parts, e.g. printed circuit boards like control units or user interfaces. A relevant number of said modular components is of electrical nature, which modular components have to be supplied with electrical energy and which are electrically connected with other electrical components for information and/or power transfer. In production facilities for household appliances, nowadays, there is already an advanced level of automation, which is reflected in an automated assembly of components, for example arrangeable in a housing of the household appliance. However, there are still manual assembly steps required for establishing electrical contacts, particularly by connecting plug contacts of wiring harnesses.

It is an object of the present invention to provide a household appliance, which is constructed in such a way that the level of automation in production facilities of household appliances can be further increased. It is a further object of the present invention to provide a method for assembling a household appliance, which supports an advanced level of automation during assembly of a household appliance.

The object is achieved by a household appliance comprising a first circuit board and a second circuit board or a first circuit board and a mains connection unit, which are electrically connectable by a connection means comprising at least one connection line. The first circuit board comprises a first electrical connector for an electrical connection for power and/or information transmission. The first electrical connector of the first circuit board is equippable or is configured to be equipped with the connection line after arrangement of the first circuit board in a housing or installation case of the household appliance, i. e. the first circuit board includes the first electrical connector prior to its arrangement in the housing or installation case, at which time of arrangement the first electrical connector is not yet equipped with the connection line. Preferably, the first electrical connector is equippable after arrangement of both the first circuit board and the second circuit board or of both the first circuit board and the mains connection unit in the housing or installation case. At least the first circuit board is arrangeable or arranged in the housing or installation case of the household appliance at a predefined position in a way that also the first electrical connector is arranged at a predefined position. The first electrical connector, which is arranged at said predefined position, is accessible for the equipment with the connection line from above, preferably for automated equipment in a top down movement. In particular, an equipment robot is used for said automated equipment.

According to an aspect of the present invention, the intended increase of the level of automation is achieved by a configuration of an electrical module or component, particularly of a circuit board, in such a way as to be electrically connected after its installation in the housing or the installation case, which may be executed in an assembly movement from above. Said electrical connection is performed by equipment of the electrical connector of the module or component, notably of the circuit board, e.g. of the first circuit board, with the connection line. On the other hand, also the household appliance may be configured to receive the connection line for the electrical connection of the electrical module or component, particularly receiving also the electrical module or component itself to be assembled inside of the housing or installation case, during an equipment movement, particularly by an equipment robot moving and connecting the connection line to electrical module or component, which equipment movement is executed at least approximately orthogonally to a base area or reference area of the household appliance, e.g. a base wall of the housing or installation case. In particular, the base area or the reference area of the housing or of the installation case is at least approximately horizontally aligned with a mounting surface or an assembly line in a production facility and said assembly movement and/or an equipment exercise for the connection of the connection line is executed in a top down assembly and/or equipment movement.

The household appliance is particularly a cooking appliance and may be a cooking hob, in particular an electrically driven cooking hob. A specifically selected household appliance is an induction cooking hob.

The installation case may be a receptacle or compartment of the household appliance and it may be included in the housing of the household appliance. In particular, the installation case is a protection box, specifically in the example of a cooking hob.

The circuit board, in particular at least one of said first circuit board and said second circuit board, may be a delivery system for delivery of electrical power to the at least one consumer load, for example a heating element of the household appliance, and said delivery system is in particular a power board, what is specifically valid for the case of a cooking hob, particularly of an induction cooking hob.

The mains connection unit for a connection of the household appliance to the electric power supply may be a module or component that is combined with another component or module, i. e. it may be mounted in combination with said other component or module. It may be a module or component included in one of the first and second circuit boards. Preferably however, the mains connection unit is a separate component or module, which is mounted during a separate mounting step, notably during an automated mounting step, preferably by means of an assembly robot. Specifically, the mains connection unit is a mains terminal block or a power supply box.

The household appliance may also comprise an electric or electronic filter unit, more specifically an interference suppressor filter or mains suppression filter, which may be included in a combined mains connection and interference suppression filter board or which may be positioned on a circuit board separate from the mains connection circuit board. Additionally, or alternatively, any kind of circuit board requiring or switching electrical power may be included in the household appliance as well.

With such a setup, the household appliance may be equippable or may comprise any one of the following example configurations for their electrical interconnection(s):

a first and a second circuit board;

a first circuit board and a mains connection unit;

a first and a second circuit board and a mains connection unit, the mains connection unit preferably being arranged between the first and the second circuit boards and more preferably being connected to the first circuit board by first connection means and to the second circuit board by second connection means;

- a first and a second circuit board and an interference suppressor filter unit or board, the interference suppressor filter unit or board preferably being arranged between the first and the second circuit boards and more preferably being connected to the first circuit board by first connection means and to the second circuit board by second connection means;
- a first and a second circuit board and a combined mains connection and interference suppression filter board, the combined mains connection and interference suppression filter board preferably being arranged between the first and the second circuit boards and more preferably being connected to the first circuit board by first connection means and to the second circuit board by second connection means;
- a first and a second circuit board and a circuit board requiring or switching electrical power, the circuit board requiring or switching electrical power preferably being arranged between the first and the second circuit boards and more preferably being connected to the first circuit board by first connection means and to the second circuit board by second connection means.

The first circuit board or at least one of the first and second circuit boards according to the aforementioned example configurations specifically comprising a delivery system for a delivery of electrical power to the at least one consumer load.

It is to be noted that the aforementioned configurations represent just an arbitrary selection of any considerable combination of circuit board(s) and/or electrical or electronic unit(s), which fall under the general composition of electrically interconnectable components as defined by claim 1, but the present invention is not limited to this arbitrary selection.

Another example for said circuit board, particularly at least one of said first circuit board and said second circuit board, is an operating panel for appliance control and/or for user interaction, which may be a user interface. Particularly, especially in the case of a cooking hob, the operating panel is mounted, and subsequently equipped with an allocated connection line, in a late step of the assembling process, preferably before a mounting of a working plate of the household appliance.

According to one specific embodiment of the invention, the first electrical connector of the first circuit board is formed as a push-on contact and the connection line is a contact bar. Said contact bar comprises a first contacting tongue or pin or flap, which may be a first flat connector, at a first end portion thereof. The push-on contact is arranged on the first circuit board in a way as to receive the contacting tongue or pin or flap during an assembly movement mainly in a direction at least approximately orthogonally to the first circuit board.

Preferably, said push-on contact is formed as blade receptacle. A specifically preferred solution for the push-on contact is a crimp contact.

Said contact bar may comprise a second contacting tongue or pin or flap, preferably a second flat connector, at a second end portion thereof and a connecting bridge connecting the first end portion with the second end portion. The second contacting tongue or pin or flap is connectable to a second electrical connector arranged at the second circuit board, which is arrangeable or arranged in the housing of the household appliance at a predefined position, particularly a second predefined position, in a way that also the second electrical connector is arranged at a predefined position, which is notably different from the predefined position of the first electrical connector. The second electrical connector may be a second push-on contact, preferably a second crimp contact.

The first push-on contact, preferably also the second push-on contact, may be soldered to the related circuit board, i. e. the first circuit board in the case of the first push-on contact and the second circuit board in the case of the second push-on contact, with an orientation at least approximately orthogonally to the main surfaces of the related circuit board.

In particular, a solder pin at at least one of the first and second push-on contacts is pushed through a through-hole in the related circuit board, i. e. the first circuit board in the case of the first push-on contact and the second circuit board in the case of the second push-on contact. The solder pin contacts a circuit, particularly a conducting path thereof, arranged at a rear side or bottom side of said circuit board.

One specific embodiment provides a contact bar, which comprises at least a third contacting tongue or pin or flap between its first and second end portions. Such third contacting tongue or pin or flap forms an intermediate connection means, which is preferably formed by a U-shaped or an Omega-shaped tongue or flap implemented by repeated bending of the connecting bridge of the contact bar.

According to an embodiment, a strain relief mechanism is implemented in the contact bar by means of a non-straight, particularly by an undulated or zigzag shaped connecting bridge. Such kind of strain relief mechanism may be advantageous for any vibrations or shocks or displacement of modules or components during subsequent assembly steps or on transportation routes.

The contact bar may comprise a fourth contacting tongue or pin or flap, preferably a fourth flat connector, at a second end portion thereof and a connecting bridge connecting the first end portion with the second end portion. The fourth contacting tongue or pin or flap is arrangeable in the mains connection unit. Said arrangement preferably takes place during the assembly or equipment movement for the connection of the first contacting tongue or pin or flap. It may also take place during the connection of the first contacting tongue or pin or flap with the first electrical connector of the first circuit board. The mains connection unit is preferably a mains terminal block or a power supply box. Additionally or alternatively, the mains connection unit comprises or is connected with a board with an interference suppressor filter.

A specific embodiment is characterized in that the fourth contacting tongue or pin or flap and/or the second end portion of the contact bar comprising the fourth contacting tongue or pin or flap is fixable or fixed to the mains connection unit, particularly to a housing or box of or inside of the housing.

One specific solution for the fixation of the fourth contacting tongue or pin or flap and/or of the second end portion of the contact bar comprising the fourth contacting tongue or pin or flap provides for a fixation means included in the fourth contacting tongue or pin or flap. Said fixation means is particularly at least one hook for hooking into an electrically isolated or plastic housing of the mains connection unit.

According to embodiments, the fourth contacting tongue or pin or flap is configured to be connected to a terminal of a mains supply line, which terminal may comprise a third push-on contact. Also the third push-on contact may be a blade receptacle, preferably a crimp contact. A specific design for the third push-on contact includes an angular deflection by 90 degrees, which may be advantageous for a low installation height.

The object is also achieved by a household appliance comprising a circuit board, particularly a first circuit board, and a grounded housing, in which the circuit board is arrangeable or arranged. The circuit board comprises an electrical connector, which is formed as a push-on contact and which is connected or connectable to a flap or pin or tongue arranged at the grounded housing, in particular a bottom wall of the grounded housing. The push-on contact is arranged on the circuit board in a way as to receive the contacting tongue or flap or pin during an assembly movement mainly in a direction at least approximately orthogonally to the circuit board. Said household appliance is particularly designed according to anyone of the afore-described embodiments.

Preferably, said push-on contact is formed as a blade receptacle. A specifically preferred solution for the push-on contact is a crimp contact.

The household appliance is particularly a cooking appliance and may be a cooking hob, in particular an electrically driven cooking hob. A specifically selected household appliance is an induction cooking hob.

In particular, a cut-out, which may be of rectangular shape, is implemented in the circuit board next to the position of the push-on contact. That way, the flap or pin or tongue at the grounded housing is enabled to pass through, or adapted to be passed through, the cut-out and is arranged to be coupled to the push-on contact from behind or below.

According to another specific embodiment of the invention, the first electrical connector of the first circuit board is a multi-pin connector with top mounted cable connection and the connection line is a plurality of single connection lines, in particular a flat wire or ribbon cable. The multi-pin connector may be a flat wire connector or ribbon cable connector. Said top mounted cable connection is performed by an insulation displacement connector in a particularly advantageous manner.

The plurality of single connection lines, in particular the flat wire or ribbon cable, may be connectable to a second and/or a third electrical connector of the second circuit board and/or of the mains connection unit after its or their arrangement in the housing of the household appliance, which second and/or third electrical connectors are preferably of the same type as the first electrical connector. The connection of the first, the second and/or the third electrical connectors by equipment with the plurality of connection lines is preferably performable in consecutive steps. That way, an interconnection of the first circuit board, the second circuit board and/or the mains connection unit can be established.

The object is also achieved by a method for assembling a household appliance, which comprises the steps a. providing a housing or an installation case;
b. mounting of a first circuit board into the housing or the installation case at a predefined assembly position;
c. mounting of a second circuit board or a mains connection unit into the housing or the installation case at a predefined assembly position, which is particularly different from the predefined assembly position of the first circuit board; and
d. equipping an electrical connector arranged on the first circuit board with a connection line for an electrical connection of the first circuit board with the second circuit board or with the mains connection unit, which electrical connector is equipped with the connection line from above.

The assembly step a. is the first one and the assembly step d. is the final one of the assembly steps a. to d. and the assembly steps b. and c. are performed in either order.

Each of the assembly steps b., c. and d. may be performed in an assembly or equipment movement in a direction at least approximately orthogonally to a base area of the housing or the installation case. The equipment of the electrical connector is preferably performed in an automated manner. In particular, an equipment robot is in operation.

The household appliance, to which the method applies or which is designed for the method to be applied on, is particularly a cooking appliance and may be a cooking hob, in particular an electrically driven cooking hob. A specifically selected appliance is an induction cooking hob. Further, the method may be applicable to a household appliance according to anyone of the afore-described embodiments.

The installation case that is provided may be a receptacle or compartment of the household appliance and it may be included in the housing of the household appliance. In particular, the installation case is a protection box, specifically in the example of a cooking hob. The interconnection of the first circuit board, the second circuit board and/or the mains connection unit is particularly provided for the purpose of power and/or information transmission.

At least one of said first circuit board and said second circuit board may be a delivery system for delivery of electrical power to the at least one consumer load, for example a heating element of the household appliance, and said delivery system is in particular a power board, what is specifically valid for the case of a cooking hob, particularly of an induction cooking hob.

The mains connection unit for a connection of the household appliance to the electric power supply may be a module or component that is combined with another component or module, i. e. it may be mounted in combination with said other component or module. It may be a module or component included in one of the first and second circuit boards. Preferably however, the mains connection unit is a separate component or module, which is mounted during a separate mounting step, notably during an automated mounting step, preferably by means of an assembly robot. Specifically, the mains connection unit to be mounted is a mains terminal block or a power supply box.

Another example for said first circuit board and/or for said second circuit board is an operating panel for appliance control and/or for user interaction, which may be a user interface. Particularly, especially in the case of a cooking hob, the operating panel is mounted, and subsequently equipped with an allocated connection line, in a late step of the assembling process, preferably before a mounting of a working plate of the household appliance.

According to a first specifically preferred embodiment of the method according to the invention, a first contacting tongue or pin or flap arranged at a first end portion of the connection line, which may be formed as a contact bar, is pushed into the electrical connector arranged on the first circuit board during the assembly step d. In particular, this assembly step d. including the equipment of the electrical connector of the first circuit board with said first contacting tongue or pin or flap is performed by an assembly movement mainly in a direction at least approximately orthogonally to the first circuit board. More particularly, this equipment of the electrical connector of the first circuit board is performed by a top down assembly movement. The first contacting tongue or pin or flap is preferably a first flat connector and/or said electrical connector may be formed as a first push-on contact, preferably as a first blade receptacle and more preferably as a first crimp contact.

One embodiment of this first specifically preferred embodiment is characterized by a fourth contacting tongue or pin or flap, preferably a fourth flat connector, which is arranged at a second end portion of the connection line and which is either pushed into an electrical connector arranged the second circuit board or is arranged in the mains connection unit for receiving a terminal of a mains supply line during a subsequent assembly step. It is preferred that one of these afore-mentioned alternative assembling executions is performed during the equipment movement for the connection of the first contacting tongue or pin or flap or during its connection with the first electrical connector of the first circuit board. Said electrical connector on the second circuit board is preferably formed as a second push-on contact, more preferably as a second blade receptacle, for example as a second crimp contact.

A second specifically preferred embodiment of the method is characterized by the first circuit board that is connected to the second circuit board or to the mains connection unit by means of a flat wire or ribbon cable. Each of the first and second circuit boards or of the first circuit board and the mains connection unit comprises at least one electrical connector and particularly electric and/or electronic components. In a first step, electrical contact is applied between each one of the electrical connectors and the related circuit board or between the electrical connector and the mains connection unit. In particular, soldering technique is used for applying the electrical contact during the first step. In a second step, electrical contact is applied between at least one of the electrical connectors and the connection line. The electrical contact is preferably applied between the connection line and a first electrical connector of the first circuit board and a second electrical connector of the second electrical board. In particular, the electrical contact applied during the second step is established by means of insulation displacement connection. At least one of the electrical connectors may be a flat wire connector or a ribbon cable connector.

The second step may be performed in an assembly movement in a direction at least approximately orthogonally to a receiving surface or receiving position in the household appliance. In particular, the assembly movement is orthogonal to the housing or the installation case of the household appliance.

In one specific embodiment the second step is performed during an automated process. Said automated process may be supported by an assembly robot.

The connection line, which is particularly a flat wire or ribbon cable, may be placed on top of the at least one electrical connector and may be pressed against and connected with the at least one electrical connector during the second step.

The second step is particularly a sequence of single second steps for applying contact between the connection line and multiple electrical connectors for their electrical connection. Said single second steps are preferably performed successively.

A specifically preferred embodiment is characterized by a connection line, which is a flat wire or a ribbon cable, and an angled connection between two successively connected terminal points or connection pins or plugs is performed by a respective bending of the flat wire. Prior to the bending step, small cuts are implemented between the single wires or cables at the bending position.

Novel and inventive features of the present invention are set forth in the appended claims.

The present invention will be described in further detail with reference to the drawing, in which FIG. 1 illustrates the general structure of an induction cooking hob in an exploded perspective view;

Figure 1:
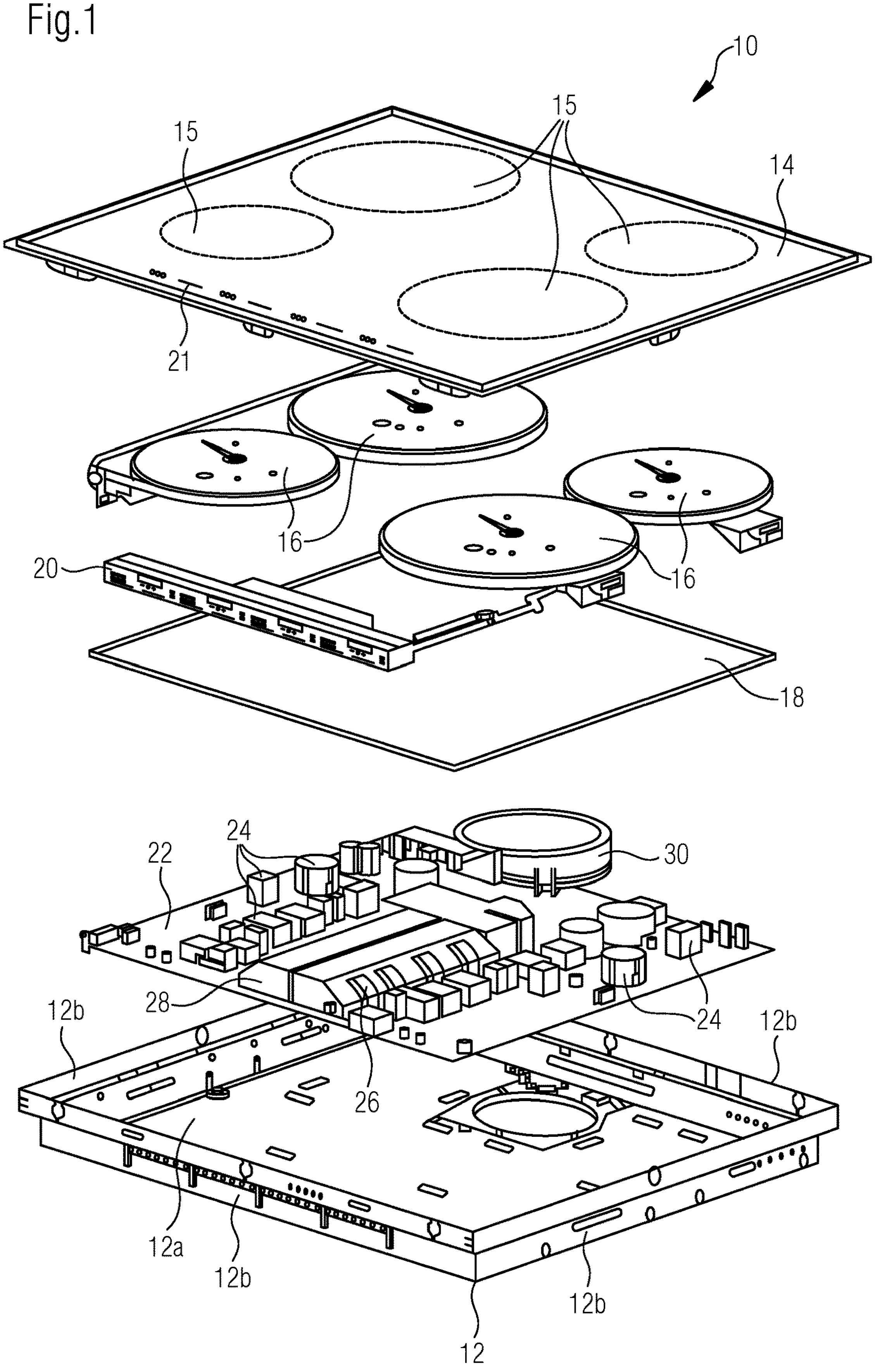
FIG. 1 illustrates an exploded perspective view of the general structure of a cooking hob 10.

The cooking hob 10 comprises a casing 12 and a panel 14. The casing 12 includes a bottom wall 12*a*, four sidewalls 12*b* and an open top side. Preferably, the casing 12 is made of metal, e.g. steel. Alternatively, the casing 12 may be made of plastics. The panel 14 covers the top side of the casing 12. For example, the panel 14 is a glass ceramic panel.

The cooking hob 10 comprises four circular cooking zones 15, two thereof with a smaller diameter, while the diameter of the other two cooking zones 15 are larger. The contours of the cooking zones are indicated by respective circles on the top surface of the glass panel 14. Each cooking zone 15 receives its heating power from a heating element 16 arranged beneath the panel 14.

A carrier 18 supports the heating element 16. Said carrier 18 is arranged beneath the heating elements 16. The carrier 18 is a metallic plate, preferably made of an aluminium material, and may be of an extension adapted to carry all four heating elements 16, in that having dimensions close to the dimensions of the glass panel 14. Alternatively, four carriers 18 may be provided, each carrier 18 supporting merely one dedicated heating element 16.

The cooking hob 10 further comprises a user interface 20 for enabling user inputs including also a control panel for controlling the cooking hob functions. The user interface 20 includes touch sensors and display means corresponding with a user interface zone 21 arranged at the front edge of the glass panel 14.

Preferably, the heating element 16 is an electric heating element. At least one printed circuit board 22 is arranged above the bottom wall 12*a* of the casing 12. A plurality of electric and/or electronic elements 24, 26 is attached on the printed circuit board 22. The printed circuit board 22 including the electric and/or electronic elements 24, 26 forms a power board of the cooking hob 10. Power electronic elements 26 for supplying the heating elements 16 with electrical power are attached to a cooling channel 28, which extends horizontally through the cooking hob 10. An air stream driven by at least one fan 30 passes the cooling channel 28 and cools down the power electronic elements 26.

In this example, the cooking hob 10 is an induction cooking hob, wherein the heating element 16 is a heating coil unit 16 comprising an induction coil and the carrier 18 is a coil carrier.

Figure 2:
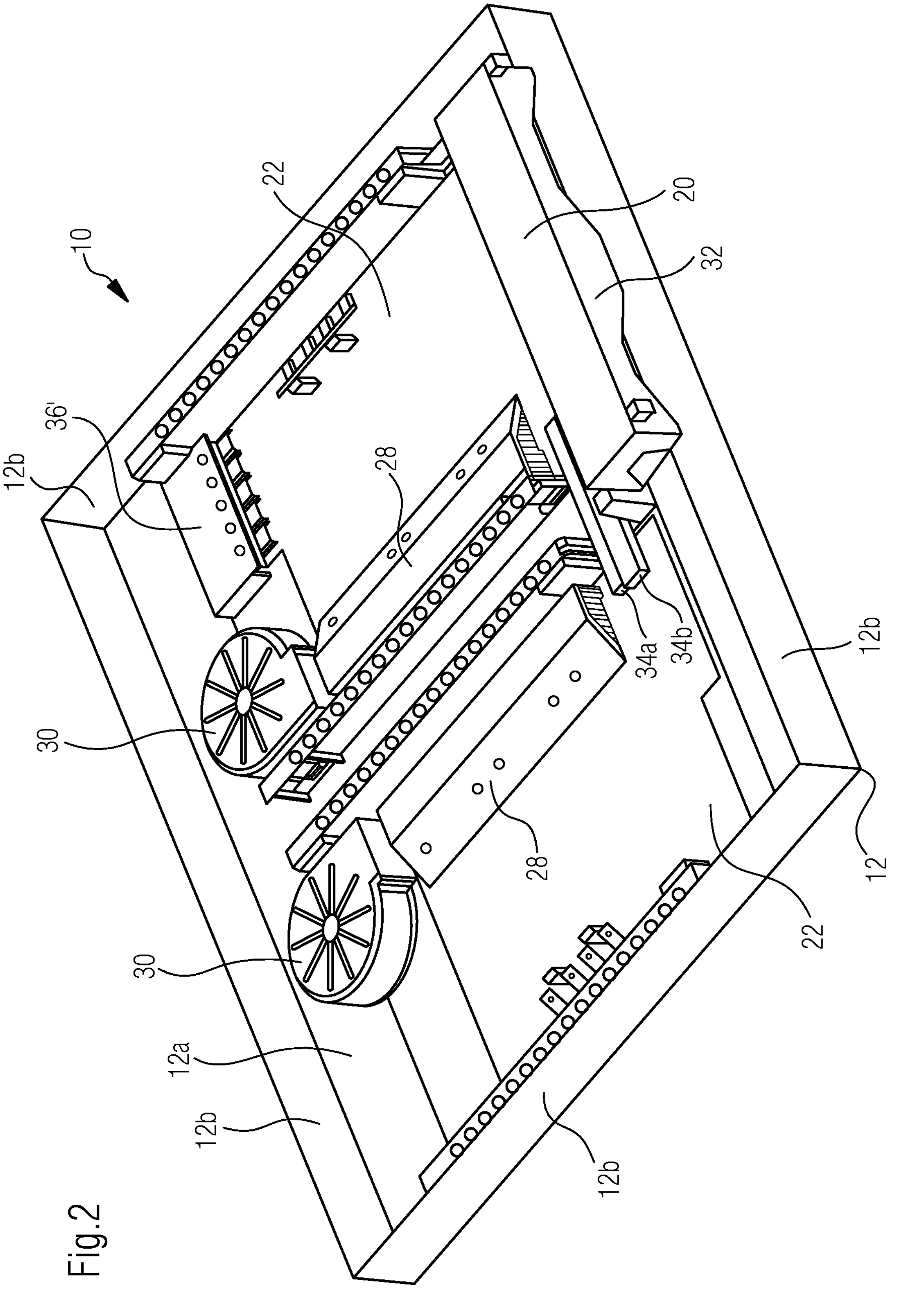
FIG. 2 is a perspective top view of an assembled induction cooking hob designed similar to FIG. 1 including component groups.

FIG. 2 illustrates schematically an assembled induction cooking hob 10 designed similar to FIG. 1. The assembly of FIG. 2 mainly differs from the solution of FIG. 1 in that the single power board 22 of FIG. 1, which is configured to supply all four cooking zones 15, is split into two power boards 22, each one thereof supplying two cooking zones 15 arranged one behind the other. Further, for the sake of clarity, FIG. 2 only shows the electrical components of the induction cooking hob 10 in the form of two power boards 22 and the user interface 20 arranged in the casing 12. Further components arranged above the power boards 22 and the user interface 20, e. g. heating coils units 16 and glass panel 14, are left out. Also the power boards 22 are illustrated only schematically, particularly without any electric and electronic parts, except their cooling channels 28 and associated fan. Moreover, the user interface 20 is also shown without any details, but it is indicated as being arranged in a user interface carrier 32 that is supported against the bottom wall 12*a* of the casing 12.

Electrical connections for power and/or information transmission between the two power boards 22 are only indicated in FIG. 2 by connection blocks 34*a*, 34*b* and one embodiment of a power supply for the entire induction cooking hob 10 is indicated by power supply box 36. Said electrical connections, both of the power boards 22 among each other and of the entire induction cooking hob 10 with a power supply cable will be described in more detail in the following with reference to FIGS. 3 to 13.

Figure 3:
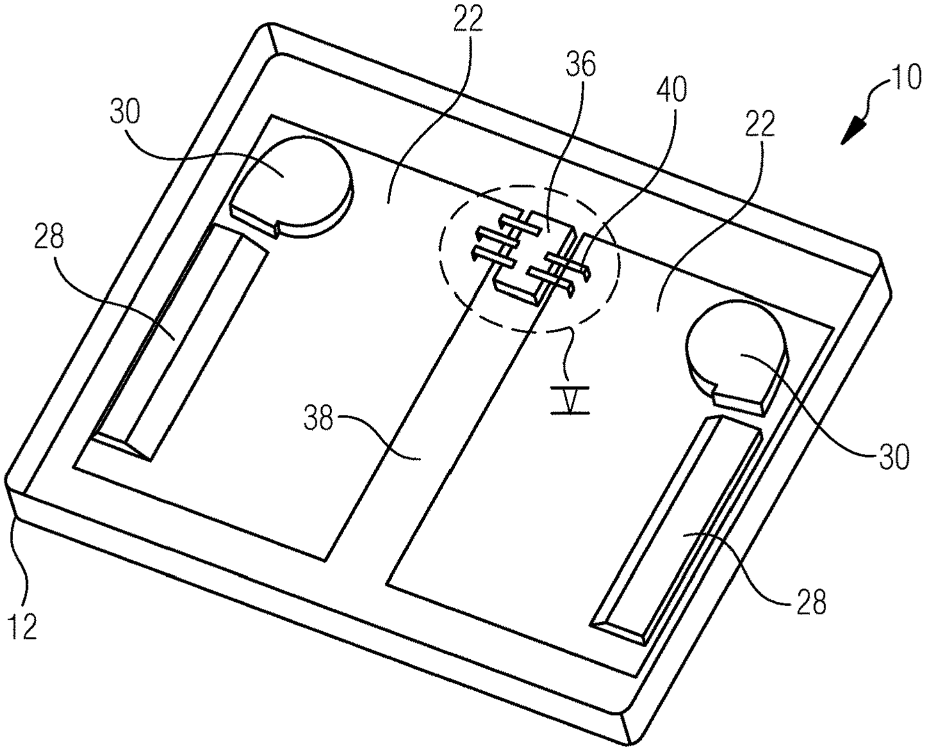
FIG. 3 is a schematic perspective view of an induction cooking hob similar to FIG. 2 with indication of a first example of an electrical connection of components groups of the induction cooking hob.

A first example for an electrical connection between component groups, particularly between two printed circuit boards, is shown in FIG. 3. This figure schematically illustrates lower sections of the induction cooking hob 10 similar to the embodiment of FIG. 2. Both embodiments according to FIGS. 2 and 3 include two power boards 22 in a side-by-side arrangement within a casing 12. The design of the power boards 22 of the induction cooking hob 10 according to FIG. 3 is to some extent different to that one of FIG. 2, notably in relation to the arrangement of the cooling channels 28 and the allocated fans 30. Also the power supply box 36 is arranged differently. While the power supply box 36 of the induction cooking hob 10 in FIG. 2 is arranged in a section of one of the power boards 22, the power supply box 36 of FIG. 3 is a separate unit arranged in a gap 38 between the two power boards 22. With such kind of arrangement according to FIG. 3 it is possible to design the two power boards in completely mirror-inverted designs, so that the development cost may be minimized. In that case also power distribution can be kept simple as illustrated by detail section V, which is characterized by an essentially symmetrical structure. As indicated in FIG. 3, the two power boards 22 are supplied with electrical power by connecting them with the power supply box 36 via electrical connections, which are kept very short, what is favourable in particular with regard to electromagnetic compatibility. Said electrical connections are provided by individual connections for phase, neutral and protective conductors, wherein the individual connections are designed as contact bars 40.

Figure 4:
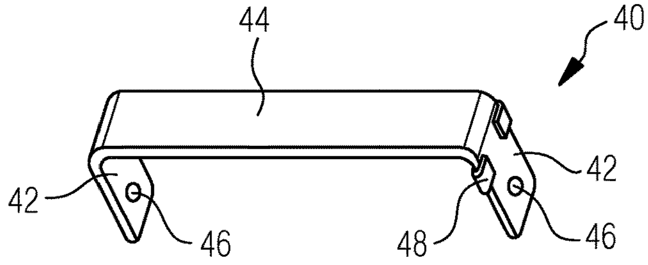
FIG. 4 illustrates a contact bar for a unipolar electrical connection between two component groups according to FIG. 3.

The design of said contact bar 40 is illustrated in FIG. 4. The general principle for the connection of the contact bar 40 with the related electrical connector arranged on e. g. a power board 22 is defined by a pair of flat connector and push-on contact, which may be a crimp contact. To this end, the contact bar comprises at its end portions contact tongues shaped as flat connectors 42, which are interconnected by a connecting bridge 44 forming a middle section of the contact bar 40. The length of this middle section is determined by the distance between the contact positions on the power board on the one hand and in the power supply box 36 on the other hand. The contact bar 40 is a metal strip, e. g. having a width of 6.25 mm, which can be made of any kind of electrically conducting material, such as iron, aluminium or copper. The end portions of this metal strip are angled by 90 degrees, thus forming the flat connectors 42. The shape of the end portions, i. e. the flat connectors 42, may be of the same design as standard flat connectors, particularly with rounded corners at the insert edge and with a hole 46 for allowing a lock of the connection with its counterpart, which comprises a snap-in nipple (not shown) for engaging with the hole 46. At the flat connector 42 that is arranged in the power supply box 36, the contact bar 40 further comprises two hook-shaped projections 48 for an engagement with a base of the power supply box 36 for the fixation of the respective flat connector 42.

Figure 5:
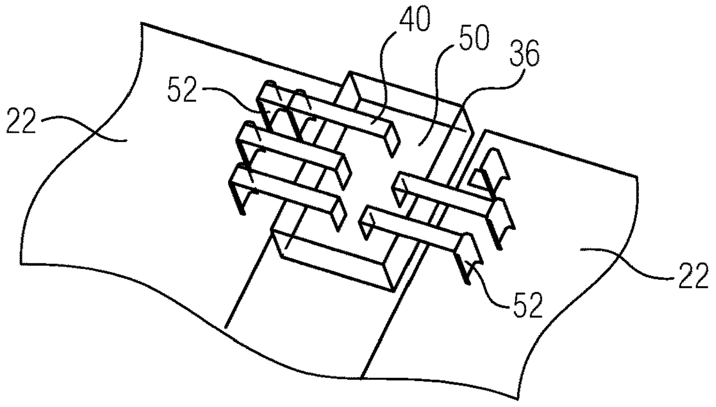
FIG. 5 is a detailed view of the electrical connection according to FIG. 3 illustrating detail V.
Figure 6:
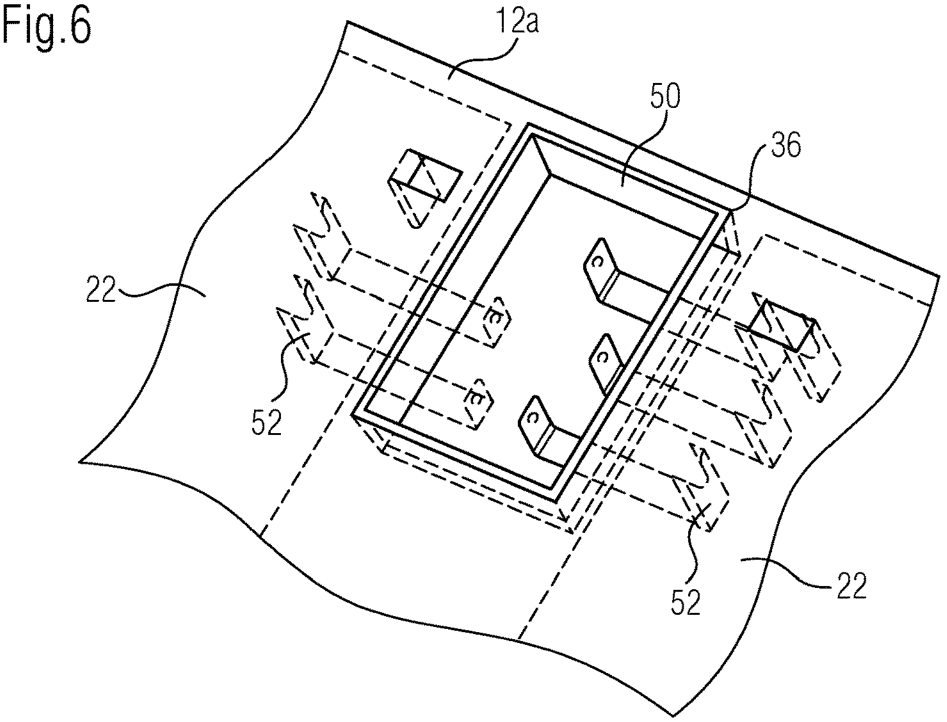
FIG. 6 is the detail of FIG. 5 illustrated by perspective view from a bottom side.

FIGS. 5 and 6 provide a detailed view of the electrical connection according to detail "V" of FIG. 3, wherein FIG. 5 is a perspective view looking from above at an angle, while FIG. 6 is a perspective view turning the detail V of FIG. 5 upside down, i. e. a look onto the bottom side of the bottom wall 12*a* of the casing 12. As already indicated, the contact bars 40 provide power supply as connector pieces to terminals of a power supply cable (not shown), which terminals are connected to the related flat connectors 42 of the contact bars 40 in the interior of the power supply box 36, which is designed as a cuboid made of plastics in order to provide electrical insulation against the power boards 22. The cuboid power supply box 36 is arranged with its bottom plate 50 (in upside down orientation) in a rectangular cutout 54 in the bottom wall 12*a* of the casing 12. The flat connector 42 of each contact bar 40 for the connection to the power board 22 is inserted into a related push-on contact 52 that is attached to the power board 22, notably to a contact area (not shown), in particular a conductor path, on the power board 22, by soldering.

FIG. 5 depicts the orientation of the induction cooking hob 10 in an assembly line insertion of the flat connectors 42 of the contact bars 40, i. e. with upright push-on contacts 52. Particularly an equipment robot of the assembly line inserts, specifically in a top down assembly or equipment movement, contact bars 40 with the respective flat connectors 42 in the related push-on contacts 52, either individually and consecutively or in parallel by means of a multiple gripper tool for simultaneous equipment of the plurality of contact bars 40.

FIG. 6 depicts the orientation of the induction cooking hob 10 in an assembly line at the moment of receiving the terminals of the power supply cable, i. e. with upright flat connectors 42. The connection is performed by insertion of the respective terminal, which comprises a push-on contact, preferably a crimp contact, from the top, i. e. by a top down assembling movement. The push-on contact is preferably angled by 90 degrees, in order to provide for a low construction height.

It should be noted that this type of connection, illustrated by FIGS. 3 to 6 for the case of power transmission from power supply box 36 to the power boards 22, may also be used for an electrical interconnection between two power boards 22 or other printed circuit boards of an induction cooking hob 10. Moreover, with the illustrated contact bars 40 not only power transmission can be realized, also a connection for information transmission may be established that way. It should be further noted, that the contact bar 40 can also have a design different from the illustrated elongated shape, rather, a curved or angled or any other and particularly complex geometrical shape may be realized.

As mentioned above, the power supply comprises phase, neutral and protective conductors. Moreover, each one of the power boards 22 is connected to a separate phase conductor of a three-phase network. Therefore, the induction cooking hob 10 is connected to the network with a four-wire cable, wherein the terminal of the neutral conductor wire is duplicated for a connection to related contact bars 40 of both power boards 22. The neutral conductor is connected by a related contact bar 40 to only one power board 22, which is the right hand one of the illustration according to FIG. 6. On the contrary, the other power board 22 is connected to the protective conductor via a common earth of the induction cooking hob 10, as will be explained in the following with reference to FIGS. 7 to 9.

Figure 7:
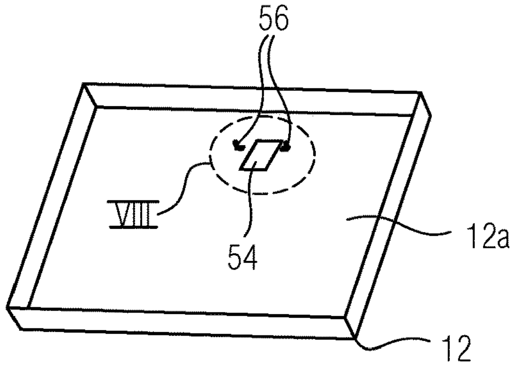
FIG. 7 is a perspective view of a casing of the induction cooking hob according to FIG. 3.

FIG. 7 illustrates the casing 12, which is in particular a protection box, of the induction cooking hob 10, without its interior, notably without the power boards 22 and the power supply box 36. The casing 12 is made of metal, in particular made of iron, and thus of an electrically conductive material. Therefore, it provides a basis for the common earth of the induction cooking hob 10. In order to connect the power boards 22 with said common earth, i. e. with the bottom wall 12*a* of the casing 12, two connecting tongues 56 are implemented in the bottom wall. Since the casing 12 is shown without the power supply box 36, FIG. 7 also gives insight to the cutout 54 provided for insertion of the power supply box 36 for a bottom side connection of the terminals of the power supply cable.

Figure 8:
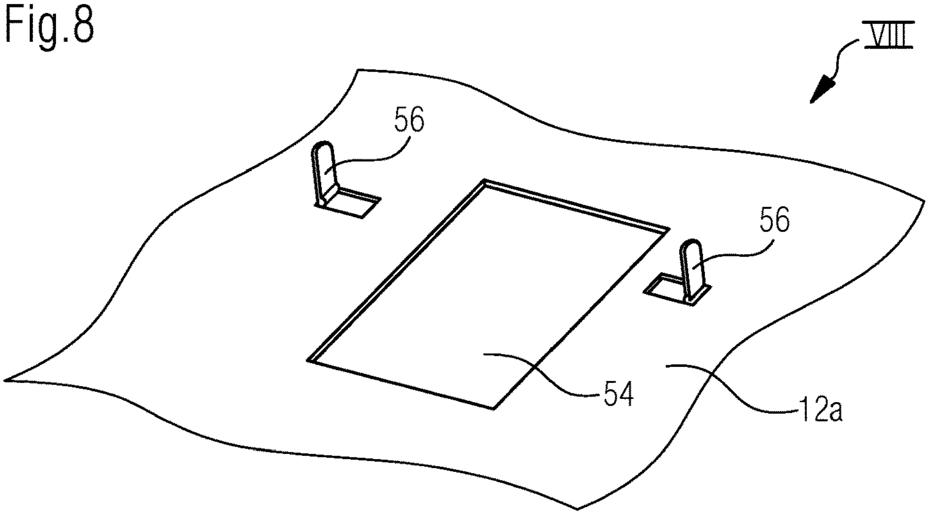
FIG. 8 is a detailed view of a section of the bottom wall of FIG. 7 illustrating detail VIII.
Figure 9:
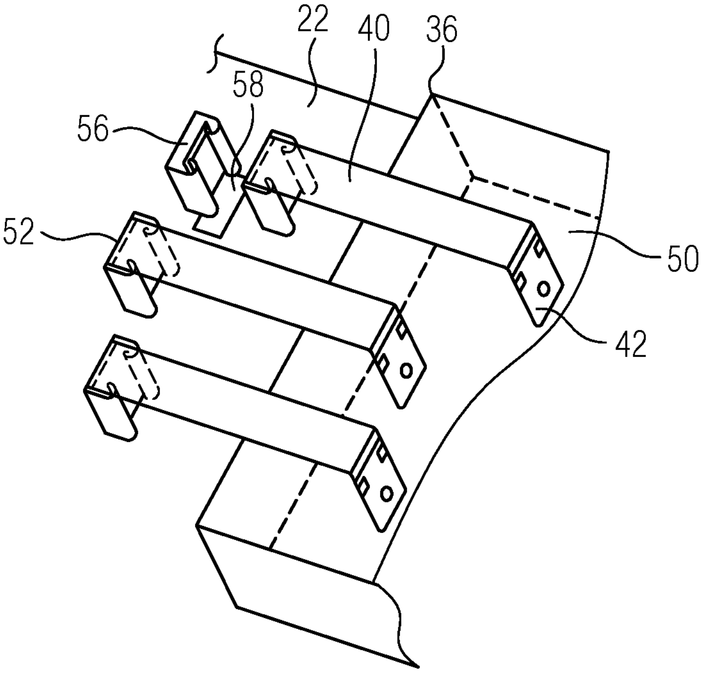
FIG. 9 is an enlarged view of the left hand side of the detail V of FIG. 5 particularly illustrating a ground connection of a power board of the induction cooking hob.

The design of the connecting tongues is illustrated in the enlarged detail view of FIG. 8 showing detail VIII indicated in FIG. 7. The connecting tongues are also formed as flat connectors, which are integrally formed with the bottom wall 12*a* by means of punching and bending up towards the interior of the casing 12 into a 90 degrees upright position. As can be seen in FIG. 9, which is an enlarged view of the left hand side of the detail V of FIG. 5, the connecting tongue 56 is connected to a related push-on contact 52 on the power board 22 from below, i. e. the connecting tongue 56 passes through a rectangular cutout 58 in the printed circuit board of the power board 22 and is inserted into the related push-on contact 52 from bottom to top. This insertion is performed jointly with the assembling of the power board 22 in the casing 12.

Figure 10:
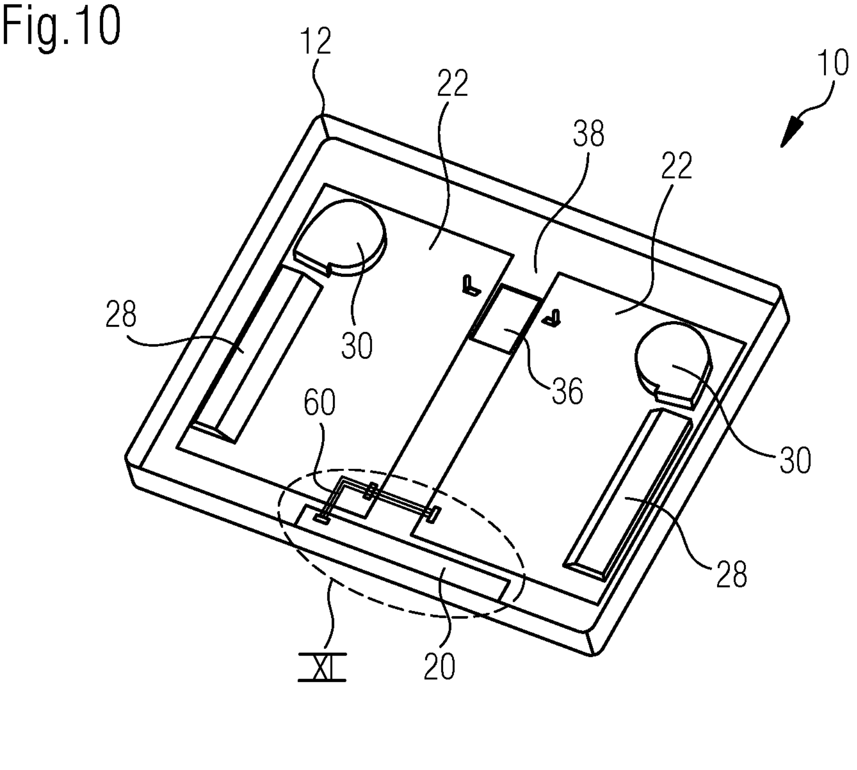
FIG. 10 is a schematic perspective view of an induction cooking hob similar to FIG. 3 with indication of a second example of an electrical connection of components groups of the induction cooking hob.

A second example for an electrical connection between component groups, particularly between two printed circuit boards 22, is shown in FIG. 10. This illustration is similar to that one of FIG. 3, however, in addition to the power boards 22 a user interface 20 is implemented on a front side of the induction cooking hob 10 for a better illustration of the type of electrical connection and its interconnection of both power boards 22 and the user interface 20 by means of a continuous connection line. Contrary to the type of electrical connection according to the above-described first example, the electrical connection is performed by a multicore flat wire 60.

Figure 11:
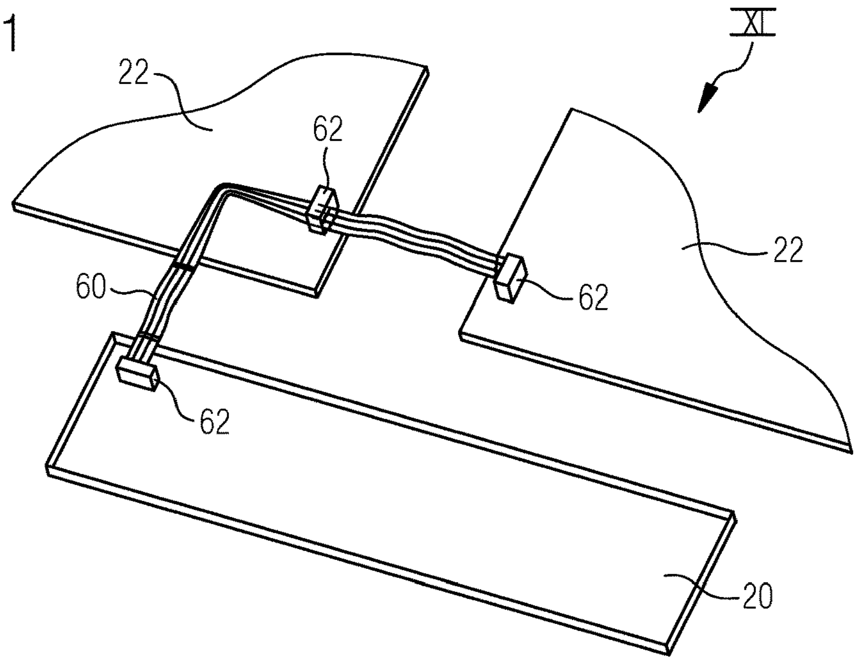
FIG. 11 is a detailed view of the electrical connection according to FIG. 3 illustrating detail XI.
Figure 12:
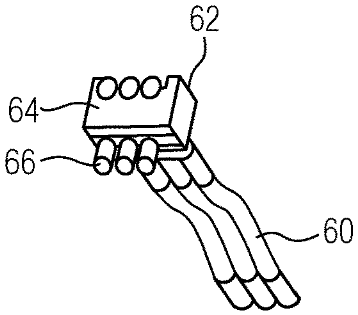
FIG. 12 is a single view of an electrical connector arranged on the component groups for their interconnection.

FIG. 11 shows the electrical connection between the two power boards 22 and the user interface 20 in an enlarged detail view according to detail XI as indicated in FIG. 10. The arrangement of the power boards 22 in a side-by side positioning and a frontal positioning of the user interface 20 requires a continuous flat wire 60, which is angled by 90 degrees in the area of the power board 22 on the left hand side. The flat wire 60 is connected to the three involved circuit boards 20, 22 by means of one group connector 62 on each of the three circuit boards 20, 22, which group connectors 62 are soldered to respective conductor paths (not shown) on each one of the circuit boards 20, 22. As illustrated by FIG. 12, which shows a group connector 62 in a separate presentation, the group connector 62 comprises a housing 64 with a topside intake for and connection of the flat wire 60 and with solder pins 66 on its bottom side for the soldered connection to the conductor paths of the circuit boards 20, 22. The structure of the group connector 62 results in a 90 degrees angle between the flat wire 60 and the direction of the solder pins 66.

Figure 13:
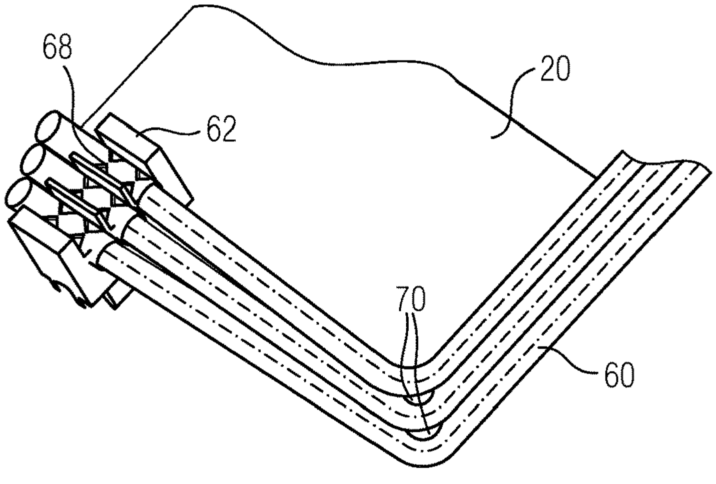
FIG. 13 is an illustration of an angled section of the flat wire connection according to FIG. 10.

The connection between the flat wire 60 and the group connector 62 is illustrated by the enlarged detail view according to FIG. 13. Said connection is based on the well-known insulation displacement technology, which establishes an electrical contact between an insulated wire and a connector contact without a previous insulation removal. Rather, by a pure press-in operation of the flat wire 60 into the related insulation displacement connection 68 arranged on the top side of the group connector housing 64, tapered blades cut into the wire insulation material until getting into contact with the metallic cable core, in which position said cable core is clamped and fixedly retained between said blades, thereby establishing the electrical contact.

The electrical contact of the second example embodiment is established in the assembly line for induction cooking hob 10 manufacturing as follows. At first, the unconnected group connectors 62 are soldered to their related circuit board, i. e. on the power boards 22 and on the user interface 20, which, however, is commonly performed already in the assembly line for producing the respective circuit board 20, 22. In the assembly line for the manufacturing of the entire induction cooking hob 10 the individual circuit boards 20, 22 are inserted into the casing 12 at their predefined installation positions according to a predefined assembly order. Preferably, said insertion of the circuit boards 20, 22 is performed in an automated way using an assembly robot. Thereafter, the electrical connection is established, preferably also using a robot having a flat wire dispenser on a robot arm. The dispensed positions the flat wire 60 over a first one of the group connectors 62 arranged on a first one of the circuit boards 20, 22. With a customary and well-known equipment tool the flat wire 60 is pressed into the related insulation displacement connections 68 and is thereby connected. Preferably, in order to more secure the permanence of the electrical connection, a clamping bracket (not shown) may be provided, which has to be arranged above the flat wire 60 after its equipment, particularly secured by a snap coupling, and which keeps the flat wire cables pressed into their contacting positions. After establishing the electrical contact with the first group connector 62, the dispenser of the robot moves to the second circuit board 20, 22 together with the further course of the flat wire 60 for establishing a next electrical connection, notably with the second group connector 62, in the same way as described above for the connection to the first group connector 62. After establishing the second connection at the second one of the circuit boards 20, 22, the dispenser of the robot moves further for establishing a third electrical connection with the third one of the three circuit boards 20, 22, which is the final one in the present example. After establishing said third connection, the flat wire 60 is cut off from the flat wire spool on the dispenser.

As shown in FIG. 11, the entire flat wire connection of the induction cooking hob 10 includes a 90 degrees angle in order to cover all involved circuit boards, namely the two power boards 22 and the frontal user interface 20. Due to the connected parallel guidance of the flat wire 60 a simple 90 degrees bending is hardly possible. Therefore, as illustrated in FIG. 13, in order to make way for said angular deflection by the individual wires of the flat wire 60, small cuts 70 are provided at the connecting lines performed in the cable insulation between adjacent wires for enabling the intended angled arrangement.

The specific example embodiment according to FIGS. 10 to 13 is defined by a flat wire connection including three single wires or cables, which may form a bus connection particularly for a transmission of signals, e. g. control signals. Such connections are especially based on DC transmission technology and may include one 5V wire, one ground wire and one signal wire in the case of a three-pole arrangement. If, alternatively, a four-pole arrangement will be considered, a fourth line, e. g. represented by an additional 14V wire, may be provided.

The above-described electrical connection according to the second example can also be serviced by an experienced repair service. In principle, a reuse of the electrical connection is possible, e. g. by an unsoldering and re-soldering at a substitute circuit board. Alternatively, a replacement of the flat wire 60 by a new one is possible using a usual tool for performing manual crimp connections.

All above-described specific embodiments, notably those ones illustrated with FIGS. 1 to 13, base on hob concepts, in particular induction hob concepts, defined by a standard of four cooking zones, the related cooking hobs especially having a standard width of 60 cm. Such cooking hobs are equipped with two power boards 22 and usually with one user interface. However, the present invention is also applicable to e. g. domestic cooking hobs having a width of 80 cm or 90 cm and comprising three power boards for five individual cooking zones or combinable cooking areas. In that case, a first circuit board, a second circuit board and a third circuit board, more specifically, a first power board 22, a second power board 22 and a power circuit board 22, which may be arranged in a side-by-side arrangement within a casing 12 including a left one, a central one and a right one, are interconnectable, particularly pairwise interconnectable as regards neighbouring boards 22, by means of above-described contact bars 40 and/or flat wires 60. Naturally, such large size cooking hobs may be operable by means of at least one user interface 20, whose interconnection with said three power boards 22 is performed accordingly as readily understood by skilled persons.

LIST OF REFERENCE NUMERALS

10 cooking hob
12 casing
12*a* bottom wall
12*b* side walls
14 glass panel
15 cooking zones
16 heating coil units
18 coil carrier
20 user interface
21 user interface zone
22 power board
24, 26 electric/electronic elements
28 cooling channel
30 fan
32 user interface carrier
34*a*, 34*b* connection blocks
36 power supply box
38 gap
40 contact bar
42 flat connector
44 connecting bridge
46 hole
48 projections
50 bottom plate
52 push-on contact
54 cutout
56 connecting tongues
58 circuit board cutout
60 flat wire
62 group connector
64 housing
66 solder pin
68 insulation displacement connection
70 small cuts

The invention claimed is:

1. A household appliance comprising:
a first circuit board and a second circuit board or
a first circuit board and a mains connection unit comprising a mains terminal block or a power supply box,
which are electrically connectable by a connection means comprising at least one connection line,
wherein the first circuit board comprises a first electrical connector for an electrical connection for power and/or information transmission,
wherein the first electrical connector of the first circuit board is equippable with the connection line after arrangement of the first and second circuit boards or of the first circuit board and the mains connection unit in a housing of the household appliance,
wherein at least the first circuit board is arrangeable or arranged in the housing of the household appliance at a first predefined position in a way that also the first electrical connector is arranged at a first corresponding predefined position,
and wherein the first electrical connector, which is arranged at said first predefined position, is accessible for automated equipment with the connection line from above in a top down movement by an equipment robot.

2. The household appliance according to claim 1, wherein the first electrical connector of the first circuit board is formed as a first crimp contact,
and the connection line is a contact bar, which comprises a first flat connector at a first end portion thereof,
wherein the first crimp contact is arranged on the first circuit board in a way as to receive the first flat connector during an assembly movement mainly in a direction at least approximately orthogonally to the first circuit board.

3. The household appliance according to claim 2, wherein the contact bar comprises a second flat connector at a second end portion thereof and a connecting bridge connecting the first end portion with the second end portion, which second flat connector is connectable to a second crimp contact arranged at the second circuit board, which second circuit board is arrangeable or arranged in the housing of the household appliance at a second predefined position in a way that also the second electrical connector is arranged at a second corresponding predefined position.

4. The household appliance according to claim 2, wherein the first crimp contact and the second crimp contact are soldered to the respective first and second circuit boards with an orientation at least approximately orthogonally to a main surface of the respective circuit board.

5. The household appliance according to claim 4, wherein a solder pin at least one of the first and second crimp contacts is pushed through a through-hole in the respective circuit board contacting a conducting path of a circuit arranged at a rear side or bottom side of the respective circuit board.

6. The household appliance according to claim 3, wherein the contact bar comprises a third flat connector between its first and second end portions forming an intermediate connection means, the intermediate connection means preferably being formed by a U-shaped or an Omega-shaped tongue or flap implemented by repeated bending of the connecting bridge of the contact bar.

7. The household appliance according to claim 2, wherein a strain relief mechanism is implemented in the contact bar by means of a non-straight connecting bridge.

8. The household appliance according to claim 6, wherein the contact bar comprises a fourth flat connector at the second end portion thereof, which fourth flat connector is arrangeable in the mains connection unit preferably during the equipment movement for the connection of the first flat connector or during its connection with the first electrical connector of the first circuit board, the mains connection unit being a mains terminal block or a power supply box and/or comprising or being connected with a board with an interference suppressor filter.

9. The household appliance according to claim 8, wherein the second end portion of the contact bar comprising the fourth flat connector is fixable or fixed to the mains connection unit.

10. The household appliance according to claim 9, wherein the fourth flat connector comprises at least one hook configured to hook it into an electrically isolated or plastic housing of the mains connection unit.

11. The household appliance according to claim 8, wherein the fourth flat connector is configured to be connected to a terminal of a mains supply line, the terminal comprising a third crimp contact, the third crimp contact being angled by 90 degrees.

12. The household appliance according to claim 1, comprising said housing being grounded, wherein the first electrical connector of the first circuit board;

is formed as a first crimp contact, and is connected or connectable to a flap or pin or tongue arranged at the grounded housing, wherein the first electrical connector is arranged on the first circuit board in a way as to receive the flap or pin or tongue during an assembly movement mainly in a direction at least approximately orthogonally to the circuit board.

13. The household appliance according to claim 12, wherein a cut-out is implemented in the first circuit board next to the first electrical connector enabling the flap or pin or tongue at the grounded housing to pass through the cut-out and to be coupled to the first electrical connector from behind or below.

14. The household appliance according to claim 1, wherein the first electrical connector of the first circuit board is a multi-pin connector with top mounted cable connection and the at least one connection line comprises a plurality of single connection lines.

15. The household appliance according to claim 14, wherein the plurality of single connection lines is connectable to a second and/or a third electrical connector of the second circuit board and/or of the mains connection unit after its or their arrangement in the housing of the household appliance, which second and/or third electrical connectors are preferably of the same type as the first electrical connector.

16. A method for assembling a household appliance, the method comprising the following steps:

a. providing a housing or an installation case;

b. mounting of a first circuit board into the housing or the installation case at a first predefined assembly position;

c. mounting of a second circuit board or a mains connection unit into the housing or the installation case at a second predefined assembly position; and d. equipping a first electrical connector arranged on the first circuit board with a connection line for an electrical connection of the first circuit board with the second circuit board or with the mains connection unit for power and/or information transmission, wherein the first electrical connector is automatically equipped with the connection line from above in a top down movement by an equipment robot, wherein the step a. is the first one of the steps a. to d., the step d. is the final one of the steps a. to d. and the steps b. and c. are performed in either order.

17. The method according to claim 16, wherein during the step d. a a first flat connector arranged at a first end portion of the connection line, which is formed as a contact bar, is pushed into the first electrical connector of the first circuit board, which is formed as a first crimp contact, wherein the step d. is performed by an assembly movement mainly in a direction at least approximately orthogonally to the first circuit board, by a top down assembly movement.

18. The method according to claim 17, wherein a fourth flat connector, arranged at a second end portion of the connection line:

is pushed into a second electrical connector, which is formed as a second crimp contact arranged on the second circuit board, or is arranged in the mains connection unit for receiving a terminal of a mains supply line or cable during a subsequent assembly step, during the equipment movement for the connection of the first flat connector during its connection with the first electrical connector of the first circuit board.

19. The method according to claim 16, wherein the first circuit board is connected to the second circuit board or the mains connection unit by a flat wire or ribbon cable, wherein:

in a first step, electrical contact during a soldering process is applied between the first electrical connectors and the first circuit board or between the first electrical connector and the mains connection unit, in a second step, electrical contact is applied between the first electrical connector of the first circuit board and a second electrical connector of the second circuit board, and the connection line, by means of insulation displacement connection.

20. The method according to claim 19, wherein the second step is performed in an assembly movement in a direction at least approximately orthogonally to a receiving surface or receiving position in the household appliance.

21. The method according to claim 19, wherein during the second step, the connection line is placed on top of the first electrical connector and pressed against and connected with the first electrical connector.

22. The method according to claim 19, wherein the second step is a sequence of single second steps for applying contact between the connection line and multiple electrical connectors for their electrical connection, performed successively.

23. The method according to claim 16, wherein the connection line is a flat wire connector or ribbon cable connector and an angled connection between two successively connected electrical connectors is performed by a respective bending of the flat wire or ribbon cable and, prior to the bending step, by performing small cuts between the single wires or cables at the bending position.

* * * * *